United States Patent [19]
Fujino et al.

[11] Patent Number: 5,408,457
[45] Date of Patent: Apr. 18, 1995

[54] DEVICE FOR DETECTING SEISMIC MOTION

[75] Inventors: Hidesi Fujino; Masao Kataoka, both of Osaka, Japan

[73] Assignees: Osaka Gas Co., Ltd.; Kansai Gas Meter Co., Ltd., both of Osaka, Japan

[21] Appl. No.: 192,420

[22] Filed: Feb. 4, 1994

[51] Int. Cl.$^6$ ............................................. G01V 1/16
[52] U.S. Cl. ................................. 367/178; 367/179; 181/122; 33/366; 73/652
[58] Field of Search ............... 367/178, 179; 181/122; 33/366; 73/652

[56] References Cited

U.S. PATENT DOCUMENTS 4,450,353 5/1984 Sjolund .................................. 33/366
4,972,595 11/1990 Shimamura et al. ................. 33/366

FOREIGN PATENT DOCUMENTS

4-52523 2/1992 Japan .

Primary Examiner—J. Woodrow Eldred
Attorney, Agent, or Firm—Herbert F. Ruschmann; Christopher R. Pastel; Thomas R. Morrison

[57] ABSTRACT

A device detects seismic motion by linear motion of a seismic detection ball within an inner casing. Radial protrusions on the inside surface of a bottom wall of the inner casing maintain linear back-and-forth motion of the seismic detection ball while in contact with the casing bottom wall. On the inside surface of the perimeter wall of the inner casing, radially inward protrusions are formed parallel to one another to prevent rotation of the seismic detection ball in a circular path along the casing perimeter when it is lifted up from the casing bottom wall. The seismic detection ball is formed from a material unaffected by magnetic fields. The inner casing is suspended within an outer casing, in a condition of damped swaying. The inner casing is composed at least partially of a metallic material to provide sufficient weight to insure reliable automatic centering.

16 Claims, 6 Drawing Sheets

DEVICE FOR DETECTING SEISMIC MOTION

BACKGROUND OF THE INVENTION

The present invention relates to a device for detecting seismic motion which may be useful in preventing various disasters caused as a result of such seismic activity, and more particularly, to small-scale seismic detection devices which can be attached to various machines and devices including, for example, gas meters, oil stoves, elevators, and various components of chemical plants and railroads.

In prior art seismic detection devices of this type, a seismic detection ball is used as part of the detection mechanism as disclosed, for example, in Japanese laid-open utility model publication SN 61-48325.

In these prior art seismic motion detection devices, a seismic detection ball is placed within a casing whose bottom inner surface has a gentle spherically concave shape. In the central area of the bottom inner surface there is an additional concavity for holding the seismic detection ball in a centered position. Above the ball is a plunger having a saucer-shaped section whose bottom surface is spherically concave, having a curvature radius greater than the seismic detection ball. The concave spherical surface of the plunger contacts the top of the seismic detection ball, and is free to move up and down, following a motion of the ball. A pressure plate above the plunger is fixed at one end, and a shaft protruding from the central area of the top of the plunger is connected to the other end of the pressure plate. The tip of an activation lever for a sensing switch contacts the top surface of the pressure plate where the plunger shaft is attached.

During seismic activity, movement of the seismic detection ball within the casing pushes the plunger upward, causing the plunger shaft to upwardly displace the pressure plate, along with the activation lever, thereby closing the sensing switch. The closing and subsequent opening of the switch produces a pulse signal indicating seismic activity.

For these devices to generate the required pulse signal in response to the seismic motion, it is necessary for the seismic detection ball to be moved back and forth in a linear fashion. However, the problem with these seismic motion detection devices is that due to the spherical concavity of the inside bottom surface of the casing, the seismic detection sphere does not consistently move back and forth in a linear fashion, but may instead move in circular path, following the casing perimeter. When such circular motion occurs, the seismic detection ball maintains the plunger in an upwardly displaced position. As a consequence, the sensing switch is held in the closed position, and the expected pulse signal is not generated. This prevents the accurate detection of seismic motion.

In an attempt to solve this problem, in Japanese laid-open patent publication SN 4-52523, the present applicant proposes a seismic motion detection device having a concave bottom inner surface formed with a plurality of centrally located protrusions. These protrusions are arranged radially, sloping upward and outward. In this proposal, the rotation of the seismic detection ball is regulated in a set direction along the radial protrusions. This structure assists the ball in moving in a generally linear, back-and-forth fashion to more consistently produce the expected pulse signal in response to seismic motion, thereby allowing accurate detection of seismic motion.

These types of seismic detector devices are often installed within outdoor gas meters, or used in other similar applications where they may receive outside impacts unrelated to seismic motion. When such shocks are of great enough magnitude, the seismic detection ball within the casing may move in a circular path along the inside perimeter wall, lifted along the concave bottom wall to a position beyond the radial protrusions. Devices relying upon centrally located radial protrusions on the bottom wall are not fully effective in controlling this type of circular rotational motion.

In order to prevent circular motion of the seismic detection ball caused by an external impact, there are devices such as that disclosed in Japanese laid-open patent SN 63-263423, which have one or more protrusions formed on the inside surface of the bottom of the casing and appropriately located. Should the seismic detection ball begin to rotate along the inner perimeter casing wall, it strikes a protrusion, preventing further rotation.

Although effective in preventing circular motion of the seismic detection ball, this type of device may produce undesirable, erratic motion. By having its direction of motion abruptly altered upon striking a protrusion, the seismic detection ball may bounce back and forth, between the inner perimeter casing wall in an irregular manner before coming to rest. This erratic motion disturbs the signal waveform produced by the sensing switch and may lead to faulty detection.

Furthermore, the protrusions arranged along the inside surface of the bottom of the casing are only effective in preventing circular motion of the seismic detection ball along the casing perimeter. Rotation of the seismic detection ball along the bottom wall of the casing due to seismic motion may cause non-linear motion just as in the previously described seismic detection devices, due to the concavity of the bottom wall. Depending on the direction of rotation of the seismic detection ball, instead of moving back and forth in a linear fashion, motion may instead be non-linear or circular, preventing the accurate detection of seismic activity.

Placement of protrusions on the bottom of the casing to limit circular rotation around the casing perimeter further requires a larger diameter casing, contrary to the desired production of small-scale seismic detection devices.

In addition to the consideration of non-linear motion of the seismic ball, the prior art also addresses the need to self level such devices, in order to maintain the ball in the center of the concave bottom region in the absence of seismic activity. To accomplish this, prior art devices have been constructed to permit damped swaying of the casing, in which the seismic ball is confined within an outer housing. The casing is suspended from above by a suspension shaft fixed to the casing or to the attachment side so it can sway freely, while the other end of the suspension shaft forms a wing piece, which is disposed within in a sealed cavity filled with high viscosity fluid. In an alternative construction, the casing is arranged within the outer casing while the bottom area between the casing and the outer housing is filled with high viscosity fluid. Synthetic resin has been used as a material for constructing devices of this type because of ease of forming, low cost, etc. Because of the overall reduction in weight in these small-scale devices, there is often insufficient moment required to overcome the damper effect from the high viscosity fluid to achieve automatic centering.

In order to overcome this insufficient moment, a proposal has been made, as in Japanese laid-open utility model publication SN 3-5314, to attach a weight having a specific gravity greater than the material from which the casing is fabricated in order to lower the center of gravity. This solution, however, requires the tedious task of separately attaching a weight to the bottom of the casing. In addition, the weight must remain reliably affixed to the casing over a long period of time, despite any impact received. Because of the positioning of the weight on the casing bottom, as well as the fact that the weight and casing are made of different materials, maintaining a reliable bond is difficult.

With a current trend toward smaller and lighter-weight devices, the above described type of seismic detection device has been used widely, installed in a variety of machines. However, magnets are often present within the machines in which the devices are installed. Since steel is often used as the main component in the seismic detection balls, they may be adversely affected by the magnetic field. This results in a reduction in sensitivity or a complete failure to detect seismic activity. This undesirable effect of magnetic fields becomes more pronounced with increasing miniaturization of the seismic devices.

OBJECTS AND SUMMARY OF THE INVENTION

Accordingly, it is an object of the invention to provide a device for detecting seismic motion of the type that uses a captive seismic detection ball which overcomes the drawbacks of the prior art.

It is a further object of the invention to provide a reliable, non-malfunctioning seismic detection device which effectively prevents circular motion of the seismic detection ball motion within the casing when the device is exposed to seismic motion or a large impact from the outside.

It is a still further object of the invention to provide a device for detecting seismic motion which can reliably maintain adequate moment necessary for automatic centering of the casing in which the seismic detection ball is held.

It is yet a further object of the invention to provide a device for seismic detection which is sensitive to seismic activity regardless of the machine in which it is installed or the position within the machine in which it is installed and its proximity to a magnetic field.

Briefly stated, there is provided a device that detects seismic motion by linear motion of a seismic detection ball within an inner casing. Radial protrusions on the inside surface of a bottom wall of the inner casing maintain linear back-and-forth motion of the seismic detection ball while in contact with the casing bottom wall. On the inside surface of the perimeter wall of the inner casing, vertical protrusions are formed parallel to one another to prevent rotation of the seismic detection ball in a circular path along the casing perimeter when it is lifted up from the casing bottom wall. The seismic detection ball is formed from a material unaffected by magnetic fields. The inner casing is suspended within an outer casing in a condition of damped swaying. The inner casing is composed at least partially of a metallic material to provide sufficient weight to insure reliable automatic centering.

In accordance with these and other objects of the invention, there is provided a device for detecting seismic motion, which comprises: an inner casing, a seismic detection ball rotatably movable within the inner casing, switch means for opening and closing in response to radial displacement of the seismic detection ball, a plurality of radial protrusions in an inner surface of a bottom wall of the inner casing arranged in an upward and outward slope and radiating from a central area of the bottom wall, and a plurality of vertical protrusions arranged parallel with one another on an inner peripheral wall of the inner casing, whereby a circular rotation motion of the seismic detection ball along the inner peripheral wall when the seismic detection ball is lifted up from the bottom wall is prevented.

According to feature of the invention, there is further provided a device for detecting seismic motion, which comprises: an inner casing, a seismic detection ball rotatably movable within the inner casing, switch means for opening and closing in response to rotation of the seismic detection ball, means for suspending the inner casing, including means for damping swaying of the inner casing, whereby the inner casing has automatic centering capabilities, the inner casing including a two layer structure, the two layer structure including an inside case and an outside case, the outside case being made of metal, and the inside case being made of a moldable, non-metallic material.

According to a still further feature of the invention, there is still further provided a device for detecting seismic motion, which comprises: an inner casing, a seismic detection ball rotatably movable within the inner casing, switch means for opening and closing in response to radial displacement of the seismic detection ball, means for suspending the inner casing, including means for damping swaying of the inner casing, whereby the inner casing has automatic centering capabilities, and the inner casing is made of metal.

According to a still further feature of the invention, there is still further provided a device for detecting seismic motion, which comprises: an inner casing, a seismic detection ball rotatably movable within the inner casing, switch means for opening and closing in response to radial displacement of the seismic detection ball, and the seismic detection ball being made of a non-magnetic material.

According to a still further feature of the invention, there is still further provided a device for detecting seismic motion, which comprises: an inner casing, a seismic detection ball rotatably movable within the inner casing, switch means for opening and closing in response to radial displacement of the seismic detection ball, a plurality of radial protrusions in an inner surface of a bottom wall of the inner casing arranged in an upward and outward slope and radiating from a central area of the bottom wall, and a plurality of vertical protrusions arranged parallel with one another on an inner peripheral wall of the inner casing, whereby a circular rotation motion of the seismic detection ball along the inner peripheral wall when the seismic detection ball is lifted up from the bottom wall is prevented, means for suspending the inner casing including means for damping swaying of the inner casing, whereby the inner casing has automatic centering capabilities, the inner casing including a two layer structure, the two layer structure including an inside case and an outside case, the outside case being made of metal, and the inside case being made of a moldable, non-metallic material.

DETAILED DESCRIPTION OF PREFERRED EMBODIMENTS

Figure 1:
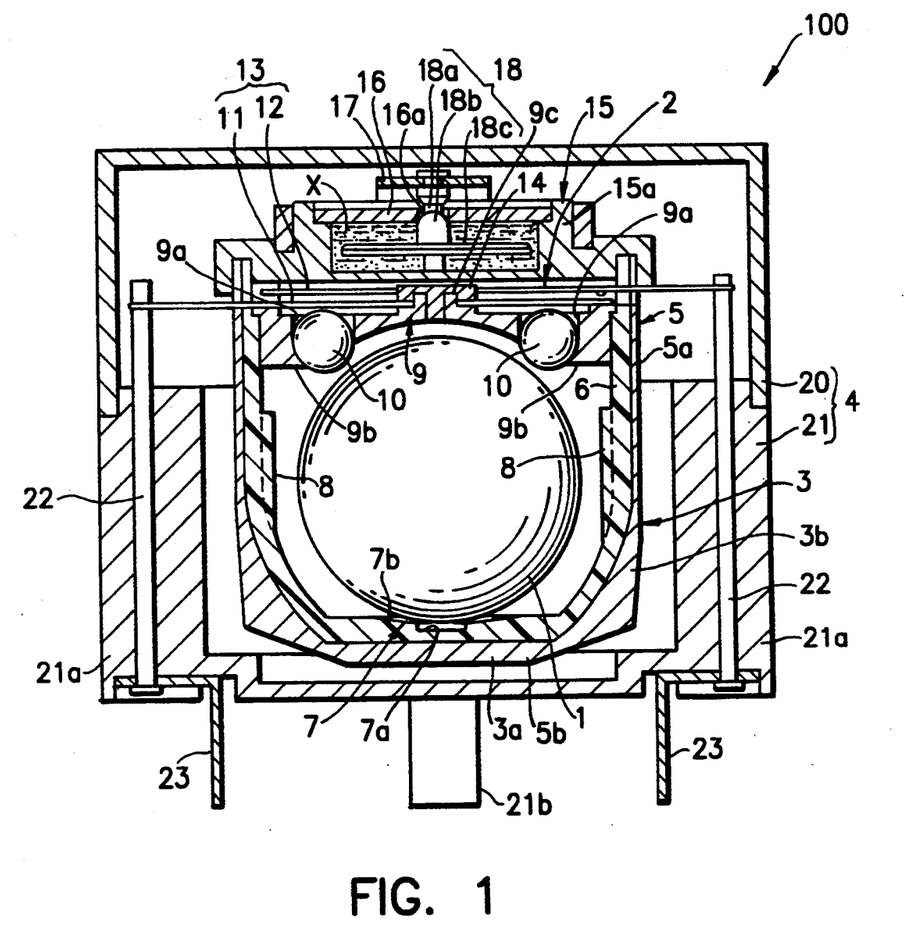
FIG. 1 is a cross sectional side view of the seismic detection device according to the present invention.
Figure 2:
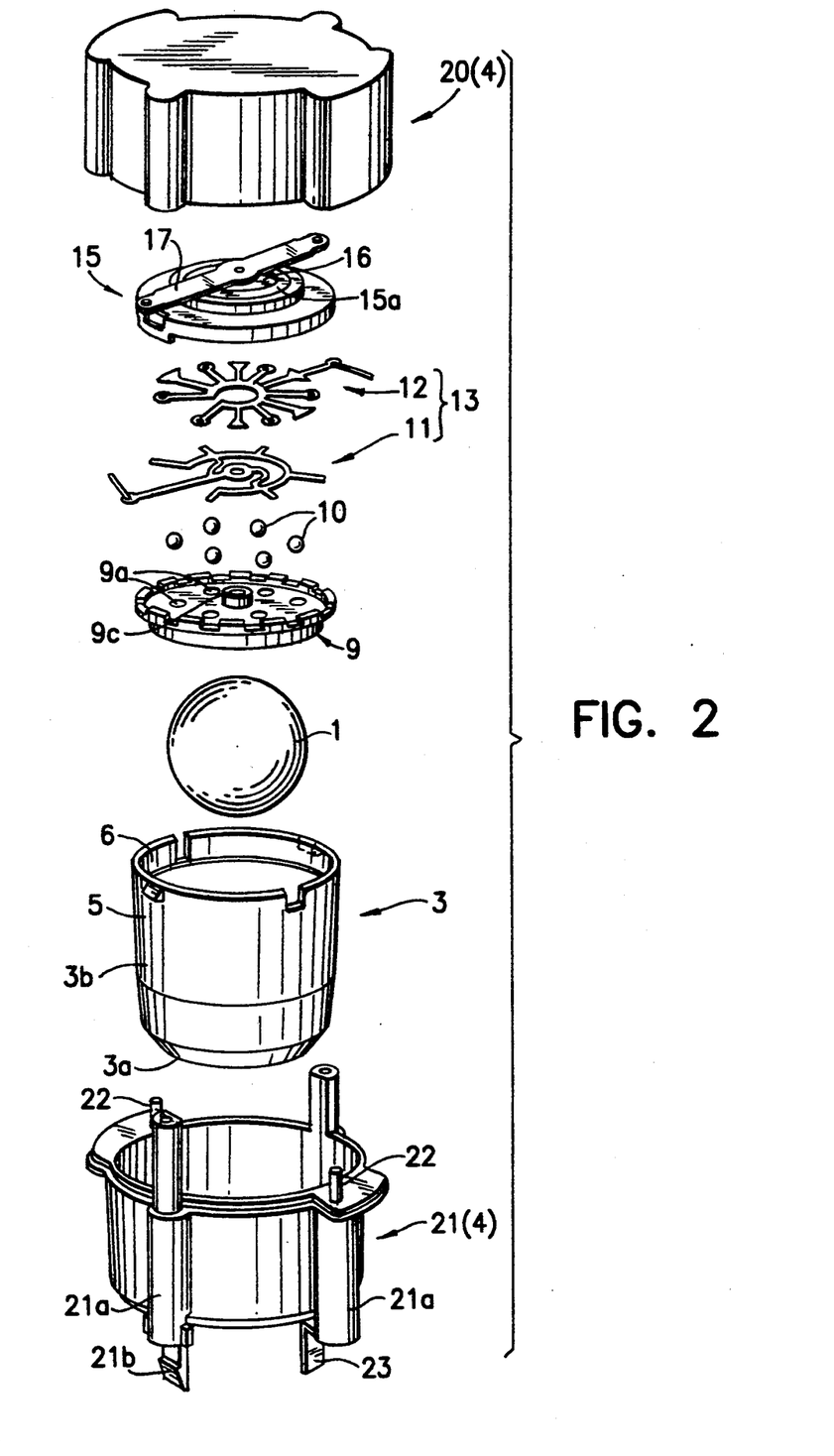
FIG. 2 is an exploded perspective view of the seismic detection device.

Referring now to FIG. 1 and FIG. 2, there is shown generally at 100 an embodiment of the seismic detection device of the present invention. A seismic detection ball 1 is captively held within an inner casing 3 having a switch assembly 2 disposed at the top end thereof. Inner casing 3 is suspended within an outer casing 4 to allow damped swaying of inner casing 3. This serves to maintain inner casing 3 in a horizontal position in the event that outer casing 4 is tilted. This feature, sometimes referred to as "automatic centering", will be described below in greater detail.

A concave indentation 7 is formed in the central area of the inside surface of a casing bottom wall 3a of inner casing 3. Seismic detection ball 1, having a diameter of approximately 11.11 mm, is centered and supported by concave indentation 7. Switch assembly 2 is arranged on the inside and upper part of inner casing 3, which opens and closes according to the motion of seismic detection ball 1.

Figure 6:
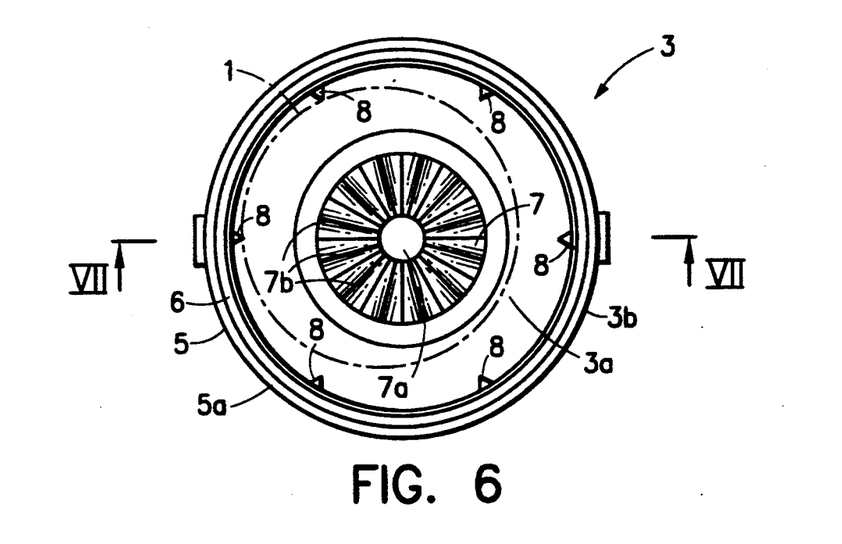
FIG. 6 is a top plan view of the casing.
Figure 7:
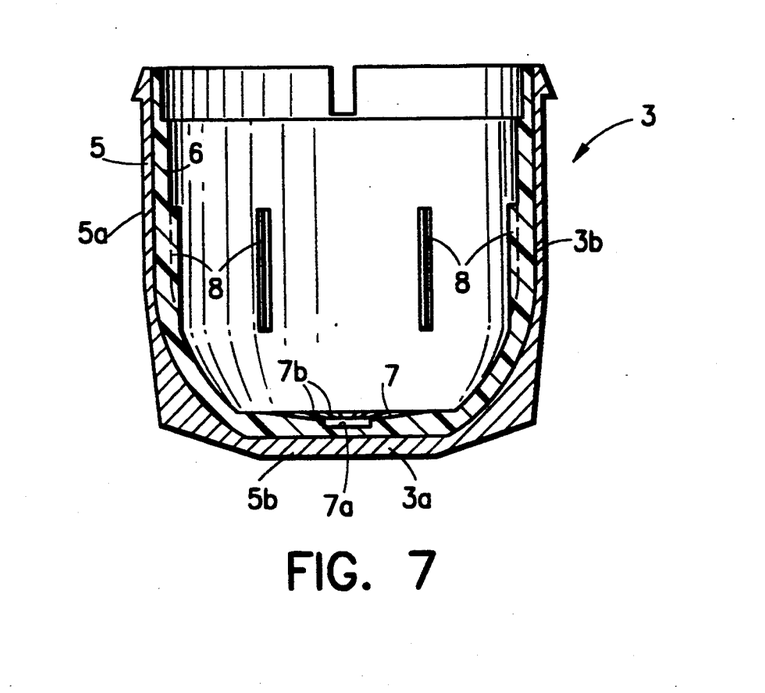
FIG. 7 is a cross-section taken along VII—VII in FIG. 6.

A back-and-forth linear movement of seismic detection ball 1 within inner casing 3, which responds consistently and accurately to seismic motion, is necessary for the accurate detection of seismic motion. Thus, in order to insure this consistent and accurate linear back-and-forth motion, the present embodiment provides a specially structured indentation 7 in the central area of the inner surface of a casing bottom wall 3a of inner casing 3. Referring to FIG. 6 and FIG. 7, there is a concavity 7a in the central area of the inner surface of casing bottom wall 3a of inner casing 3. Also, there are a total of radial twelve protrusions 7b extending radially from concavity 7a. These are arranged so that adjacent radial protrusions 7b form an angle of approximately 30 degrees and have a triangular cross-section, with the apex angle set at 140 degrees.

The diameter of concavity 7a should be specified appropriately according to degree of sensitivity desired in detecting the seismic motion. Each radial protrusion 7b has a gently rising slope outward. The desirable angle of the slope should be 4–6 degrees or less.

As a result of radial protrusions 7b, the motion of seismic detection ball 1 is limited to a direction along radial protrusions 7b. Circular movement of seismic detection ball 1 along the a casing perimeter wall 3b of inner casing 3 is prevented. Consequently, more accurate seismic detection is possible. In addition, because each radial protrusion 7b is formed with a triangular cross-section, seismic detection ball 1 maintains multiple point contact on adjacent protrusions 7b, resulting is less friction. Therefore, seismic detection ball 1 will consistently rotate in response to minor vibrations even in cases where the prior art seismic detection ball would not have responded. Thus, a smaller seismic detection ball 1 can be used compared to the prior art.

As noted above, radial protrusions 7b serve to effectively prevent circular motion of seismic detection ball 1 during seismic motion. However, there may be cases when a large impact from the outside may cause seismic detection ball 1 to be lifted from the casing bottom wall 3a of inner casing 3 and move circularly along the inner surface of casing perimeter wall 3b of inner casing 3. In these cases, radial protrusions 7b are ineffective in preventing this type of circular motion. Since seismic detection ball 1 is lifted from casing bottom wall 3a of inner casing 3 during this type of circular motion, switch assembly 2 is maintained in a closed state and reliable seismic detection is prevented. Such motion is therefore undesirable, and must be diminished as quickly as possible.

Referring to FIG. 6 and FIG. 7, the inner surface of casing perimeter wall 3b of inner casing 3 has a total of six protrusions 8, each arranged vertically and having a triangular cross section, spaced apart parallel to each other at specified intervals. Vertical protrusions 8 are positioned at a height where seismic detection ball 1 can come into contact with them in its lifted up state, so that vertical protrusions 8 can prevent seismic detection ball 1 from moving in a circular path along the inner surface of casing perimeter wall 3b.

In the preferred embodiment, vertical protrusions 8 extend from a point somewhat higher than the center of seismic detection ball 1 while at rest on casing bottom wall 3a to somewhat lower than the center thereof. In this way, vertical protrusions 8 limit circular motion of seismic detection ball 1 when it is in contact with the inner surface of casing bottom wall 3a, and also when it is lifted-up from casing bottom wall 3a.

The degree of protrusion and the interval of vertical protrusions 8 are such that seismic detection ball 1 cannot contact casing perimeter wall 3b between adjacent vertical protrusions 8. Referring to FIG. 6, as shown by the broken line, conditions must be met so that even when seismic detection ball 1 is in contact with two adjacent vertical protrusions 8, 8, it does not touch casing perimeter wall 3b between vertical protrusions 8. If these conditions are not met, and seismic detection ball 1 comes into contact with casing perimeter wall 3b, circular motion may be prolonged due to inertia. If the degree of protrusion is too great, this would also prevent adequate linear rotation of seismic detection ball 1. The desirable arrangement would be one where the closest proximity of seismic detection ball 1 and casing perimeter 3b would be 0.1 mm or a small amount greater.

It is desirable to have vertical protrusions 8 aligned with an extension line of radial protrusions 7b arranged on casing bottom wall 3a. Since seismic detection ball 1 is to rotate back-and-forth along adjacent radial protrusions 7b, 7b, if vertical protrusions 8 on casing perimeter wall 3b are instead aligned with an extension line of grooves between radial protrusions 7b formed on casing bottom wall 3a, seismic detection ball 1 would have insufficient distance in which to roll. This might distort the desired back-and-forth linear motion of seismic detection ball 1.

When inner casing 3 within seismic detection device 100 vibrates from an earthquake, seismic detection ball 1 rotates within inner casing 3. Because of the upward and outward sloping radial protrusions 7b on the inside surface of bottom wall 3a of inner casing 3, seismic detection ball 1 moves in precise back-and-forth motion in a linear fashion within inner casing 3 along the direction of radial protrusions 7b, and is prevented from moving in a non-linear fashion.

When a large impact is received from outside and seismic detection ball 1 is lifted up and tries to rotate along casing perimeter wall 3b, seismic detection ball 1 hits vertical protrusions 8 formed on the inside surface of perimeter wall 3b of the casing, and rotation motion is abated. Furthermore, since vertical protrusions 8 are arranged so that their degree of protrusion and their intervals prevent seismic detection ball 1 from coming into contact with casing perimeter wall 3b between them, this prevents contact with casing perimeter wall 3b, which has a large elastic rebound. This allows quick and effective diminution of the circular motion of seismic detection ball 1. The rotation speed of seismic detection ball 1, moving in a circular motion while lifted up above bottom wall 3a of casing 3 decreases, and seismic detection ball 1 comes into contact with bottom wall 3a of casing 3, where rotation speed is further diminished by radial protrusions 7b on bottom wall 3a.

Figure 9:
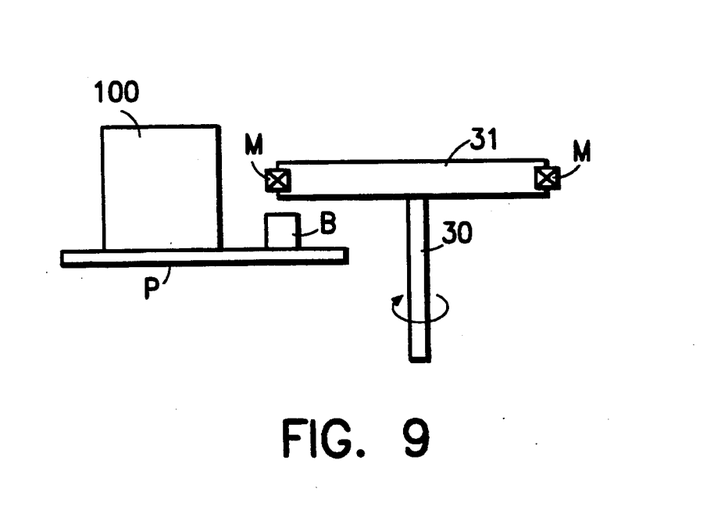
FIG. 9 is a schematic view showing typical placement of the seismic detection device in a gas meter.

Because there are applications where a magnet may be in close proximity to seismic detection device 100, seismic detection ball 1 is produced from a non-magnetic material. Referring to FIG. 9, in one such example, a seismic detection device 100 is shown installed in a gas meter. Seismic detection device 100 and a flow quantity detector B are attached to a printed circuit board P. A rotating shaft 30 having a plate 31 attached to a top portion thereof rotates at a speed proportional to a gas flow rate. Plate 31 has a magnet M on its outer perimeter positioned to rotate past flow quantity detector B. If seismic detection ball 1 were to be made of a material affected by magnetic forces, such as certain types of steel, inconsistent seismic readings may result, or in the worst case, seismic detection device 100 would be rendered altogether ineffective. Stainless steel, copper pyrite, an alloy of lead and zinc, and ceramic are some examples of suitable non-magnetic substances. By using a non-magnetic substance, the magnetic force will not influence the motion, allowing greater precision. Furthermore, positioning of seismic detection device 100 is not critical, allowing greater freedom of design and increased miniaturization of the device in which it is installed.

Figure 3:
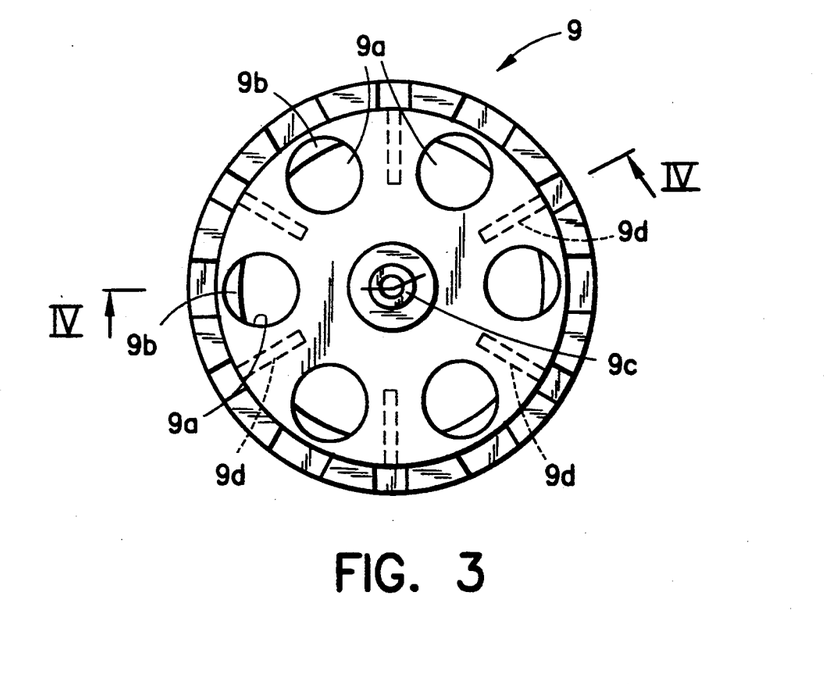
FIG. 3 is a top plan view of the small ball receptacle board for contact operation.
Figure 4:
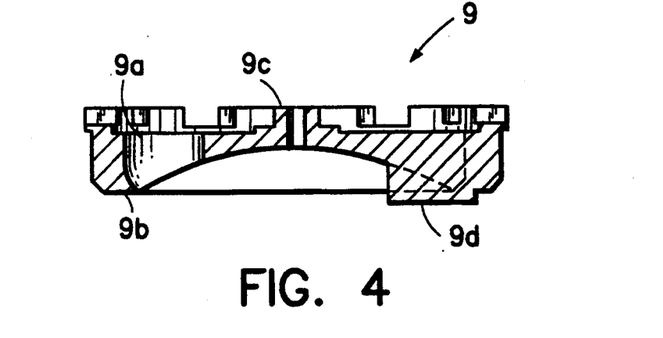
FIG. 4 is a cross section taken along IV—IV in FIG. 3.

Referring back to FIG. 1, in the inside top of inner casing 3, a small contact ball receptacle plate 9 for contact operation is formed with a concave spherical surface shape on the bottom surface thereof to match seismic detection ball 1. While at rest, seismic detection ball 1 is close to, but not in contact with small contact ball receptacle plate 9. Referring to FIG. 3 and FIG. 4, receptacle plate 9 has a total of six apertures 9a each having a diameter of approximately 2.6 mm in the preferred embodiment. Apertures 9a are arranged at regular intervals along the circle perimeter, equidistant from the center of small contact ball receptacle plate 9. Referring again to FIG. 1, each of these apertures 9a holds a small contact ball 10, each small contact ball 10 having a diameter of approximately 2.5 mm diameter and made of a material such as, for example, stainless steel. Small contact balls 10 are preferably made from a non-magnetic material for the same reasons as stated above regarding seismic detection ball 1. Small contact balls 10 are freely movable up and down within apertures 9a. A lower reduced diameter section 9b at a lower end of each aperture 9a prevents small contact balls 10 from falling completely through apertures 9a. Small contact balls 10 protrude slightly from the openings in the bottom of aperture 9a, supported by lower reduced diameter section 9b. In the central area of the top surface of small contact ball receptacle plate 9 there is a protrusion 9c for attachment of an open/close switch 13. A lower electrode piece 11 and an upper electrode piece 12 are assembled to form open/close switch 13.

On the bottom surface of small contact ball receptacle plate 9, receptacle protrusions 9d are arranged between apertures 9a for the purpose of preventing circular motion of seismic detection ball 1 when lifted-up from casing bottom wall 3a, as seen in FIG. 3. Receptacle protrusions 9d are dimensioned an appropriate size so as not to interfere with the operation of the small contact balls 10 in response to the linear motion of seismic detection ball 1.

Figure 5A:
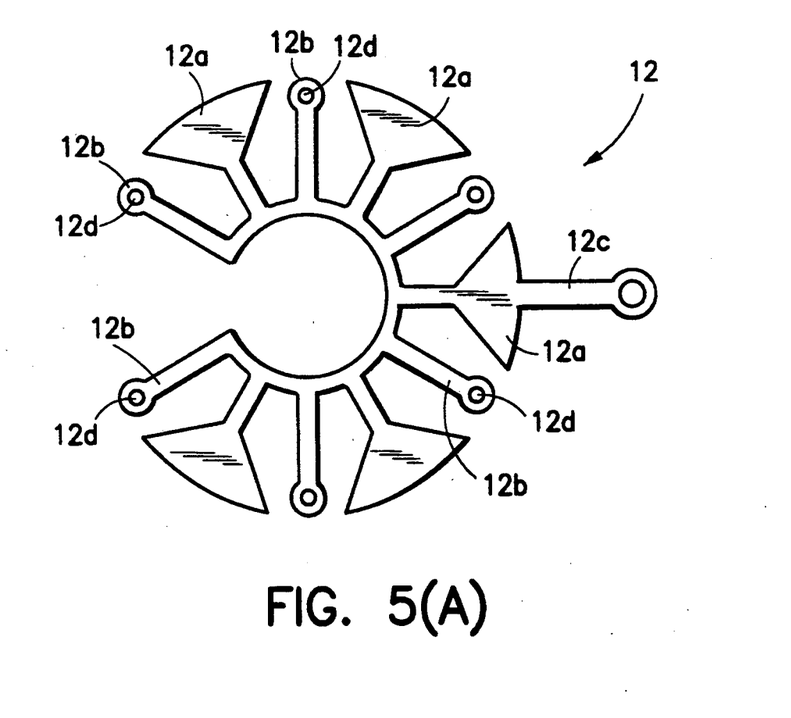
FIG. 5(A) is a top view if the upper electrode piece.
Figure 5B:
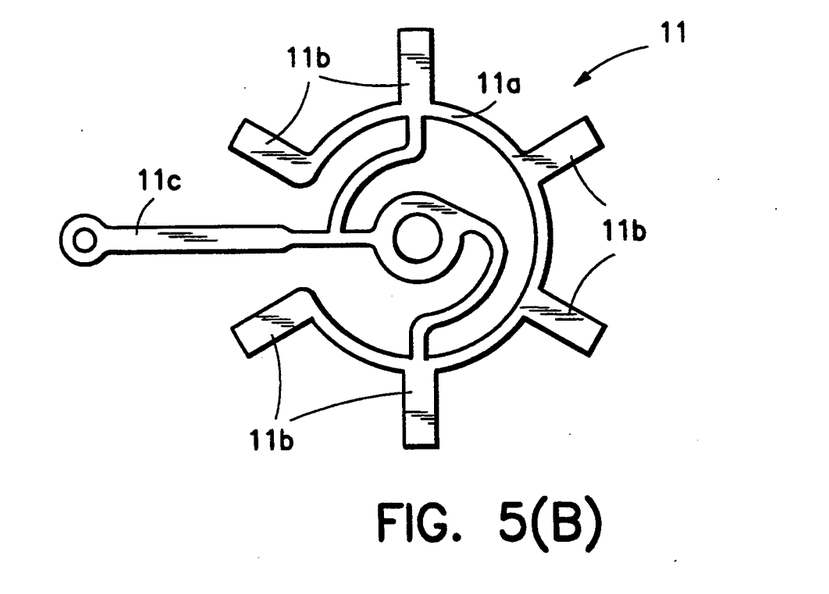
FIG. 5(B) is a top view of the lower electrode piece.

Referring to FIG. 5(A) and 5(B), lower electrode piece 11 of open/close switch 13 consists of a connecting piece 11a having a circular shape with one section missing, from which six movable contacts 11b are arranged radially. Adjacent movable contacts 11b form an angle of 60 degrees. A lower extension piece 11c extends from a central portion of lower electrode piece 11. Upper electrode piece 12 of open/close switch 13 consists of contacts 12b corresponding to movable contacts 11b and stabilizing pieces 12a, alternatingly arranged radially. An upper extension piece 12c extends from one of stabilizing pieces 12a of upper electrode piece 12.

Lower electrode piece 11 and upper electrode piece 12 are produced in the desired shape from a suitable electrically conductive material. Taking into consideration electrical properties (low contact resistance), strength (endurance), flexibility (or sensitivity), the preferred material would be a very thin plate of Cu—Be alloy, with thickness of about 0.03 mm, stamped in the shape described above, gold-plated and then given heat treatment.

Referring to back FIG. 1, the central part of lower electrode piece 11 is affixed on the protrusion 9c for attaching open/close switch 13 of small contact ball receptacle plate 9 in such a way that each movable contact 11b is positioned above each aperture 9a of small contact ball receptacle plate 9. Upper electrode piece 12 is arranged above this via an insulating piece 14 such that upper electrode piece 12 and lower electrode piece 11 are close to one another, but not touching. Each contact 12b of upper electrode piece 12 is vertically aligned with a corresponding movable contact 11b of lower electrode piece 11. Lower extension piece 11c and upper extension piece 12c are arranged so that they extend in opposite directions. A contact point 12d is formed on an outermost end of each contact 12b.

The space between seismic detection ball 1 at rest and small contact balls 10 is a very small, about 0.2 mm.

When seismic detection ball 1 rotates within inner casing 3, seismic detection ball 1 contacts a small contact ball 10 in a corresponding position, and small contact ball 10 is displaced upwardly. Small contact ball 10 in turn upwardly displaces the corresponding movable contact piece 11b of lower electrode piece 11, causing movable contact piece 11b to come in contact with the corresponding contact piece 12b of upper electrode piece 12. When seismic motion is no longer present and the linear rotation of seismic detection ball 1 stops, seismic detection ball 1, small contact balls 10 and movable contact pieces 11b all return to their original positions, and are ready for the next detection of seismic motion.

An inner casing cover 15 is attached to inner casing 3 at an upper opening thereof. A cylindrical piece 15a is formed in the central area of inner casing cover 15 for receiving and connecting with a cover piece 16, formed in a corresponding shape.

Inner casing 3 is suspended in a free state within outer casing 4 by a hanging shaft 18 which is attached to and downwardly protruding from the central area of an elongated layered suspension board 17. Layered suspension board 17 is fixed at both ends to outer casing 4.

Hanging shaft 18 comprises a shaft piece 18a, a fixing piece 18b and a wing piece 18c. Fixing piece 18b has a spherical bulge and is disposed on the bottom of a shaft piece 18a. Wing piece 18c is saucer shaped and is disposed below fixing piece 18b. Shaft piece 18a is movable on a hanging shaft insertion aperture 16a formed in the central area of cover piece 16. Fixing piece 18b is fixed on the lower edge of hanging shaft insertion aperture 16a. It is sufficient that at least the upper half of fixing piece 18b is formed in a spherical bulge shape. Furthermore, wing piece 18c does not necessarily have to have a saucer shape and may formed in any other suitable shape.

The preferred dimensions for each of the parts of the above embodiment are as follows: shaft piece 18a of hanging shaft 18 has a diameter of approximately 0.8 mm, hanging shaft insertion aperture 16a has a diameter of approximately 1.3 mm, fixing piece 18b has a radius of approximately 0.75 mm, inner radius of cylindrical piece 15a is approximately 6.3 mm and wing piece 18c has a diameter of approximately 6 mm.

A high viscosity fluid X is contained within the space surrounded by cylindrical piece 15a and cover piece 16. The object of using high viscosity fluid X is to permit conductivity of seismic motion from outer casing 4 to inner casing 3 in the suspended state, as well as to dampen swaying caused by inertia of the inner casing.

Properties of high viscosity fluid X must provide the following: maintenance of a level orientation of inner casing 3; efficient conduction of seismic motion to inner casing 3; no deterioration of performance over a long period of time; and prevention of leakage. For example, silicon oil with viscosity of 10,000–30,000 (cP) (e.g., Shinetsu Kagaku Kogyo Corp. Ltd., product name "KF-96H") can be used with satisfactory results. It is also possible to use, as necessary, a sway-controlling piece which does not interfere with centering operations, such as a conical spring between cover piece 16 and layered board 17, and a bellows to prevent fluid leakage.

Inner casing 3 has a special structure to provide increased overall weight and a lower center of gravity to insure a sufficient moment to overcome the viscous damping. In one embodiment, inner casing 3 has a two-layer structure, having its overall center of gravity lowered toward casing bottom wall 3a. An inside case 6 made of hard synthetic resin is joined in press-fitted engagement within a metallic outside case 5. A bottom wall 5b is thicker than a perimeter wall 5a of outside case 5, thereby lowering the overall center of gravity of inner casing 3.

By having outside case 5 composed of metal to form the outer part of inner case 3, as noted above, inner case 3 is heavier than one made entirely of synthetic resin. In addition, since metal is easily cut and shaped, the center of gravity may be readily adjusted as desired by adjusting the thickness of bottom wall 5b of outside case 5.

Furthermore, since outside case 5 may be formed from a metal having magnetic field shielding properties, influence from outside magnetic fields is reduced. This allows more precise seismic detection even when seismic detection ball 1 is composed of a material affected by magnetic fields.

Since inside case 6 is made of synthetic resin, the impact of seismic detection ball 1 hitting casing perimeter wall 3b during seismic motion is softened, permitting the same signal waveform as a seismic motion device 100 having an inner casing 3 made entirely of synthetic resin. In addition precision processing of radial and vertical protrusions 7b, 8 is facilitated by using synthetic resin.

Figure 8:
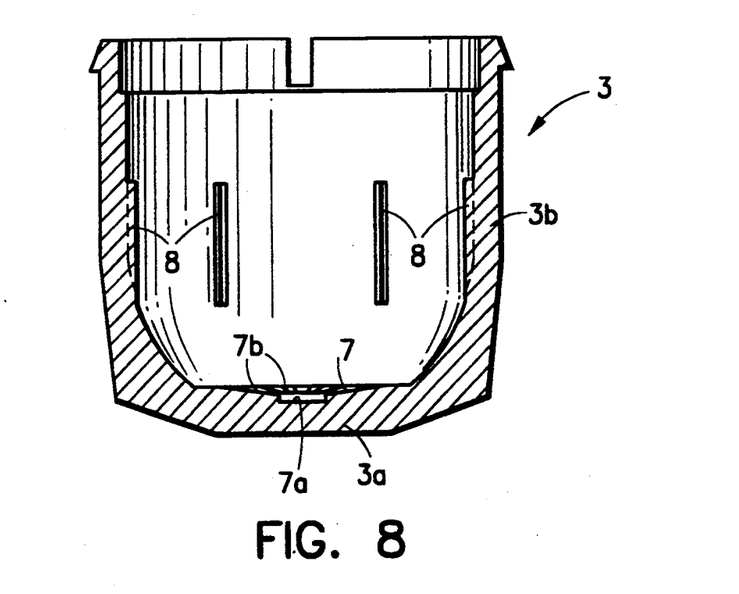
FIG. 8 is a cross-section, corresponding to FIG. 7, showing an alternate embodiment of the inner casing.

Referring to FIG. 8, an alternative embodiment is shown in which inner casing 3 is made entirely of metal. This structure can be used in place of inner casing 3 having a two-layer structure as described above, with many of the above advantages. Other structures are identical to the previous embodiment so like numerals refer to like parts.

Referring to again to FIG. 1 and FIG. 2, outer casing 4 is formed in a size large enough to accommodate inner casing 3 within it so that it has sufficient room to freely sway. Outer casing 4 is divided into an upper casing half 20 and a lower casing half 21.

Lower casing half 21 is formed in one piece with four bulges 21a on the outer perimeter thereof, arranged 90 degrees from each other. On the lower part of one pair of opposing bulges 21a, 21a are insertion fixing leg pieces 21b formed for connection to a printed circuit board. The other pair of opposing bulges 21a, 21a each have conductive terminal shafts 22 embedded and press-fit therein. Lower and upper extension pieces 11c, 12c of open/close switch 13 extending from inner casing are riveted and soldered to the top end of each of the terminal shafts 22. Reverse L-shaped terminal boards 23 are fixed to the bottom end of terminal shafts 22 and protrude downwardly. This allows direct attachment to the attachment side of the printed circuit board without using lead wires. The need for soldering connecting lead wires, as required by the prior art, is thereby eliminated, thus reducing the production cost and lowering the electrical resistance of the connections.

The above embodiments indicates an open/close switch having electrode pieces using movable contacts arranged radially, however this invention is not limited to this, and can use another switch mechanism such as the prior art type switch having a plunger-style switching mechanism as previously described.

Also, although the above embodiments indicate an inner casing that is suspended within an outer casing so that it can freely sway, the present invention is not limited to that form. For example, an outer casing may be arranged outside an inner casing, and the bottom area between inner and outer casing filed with a high viscosity fluid.

Furthermore, the present invention is not limited to a seismic device for use within a gas meter, as in the above described embodiments, but can also be applied to a seismic detection device for gas stoves, elevators, chemical plants, railroads, etc.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for detecting seismic motion, comprising:
an inner casing;
a seismic detection ball rotatably movable within said inner casing;
switch means for opening and closing an electric circuit in response to radial displacement of said seismic detection ball;
a plurality of radial protrusions in an inner surface of a bottom wall of said inner casing arranged in an upward and outward slope and radiating from a central area of said bottom wall;
a plurality of radially inward protrusions parallel with one another on an inner peripheral wall of said inner casing; and
said radially inward protrusions constraining said seismic detection ball from a circular rotation motion along said inner peripheral wall when said seismic detection ball is lifted up from said bottom wall.

2. The device for detecting seismic motion according to claim 1, wherein:
each of said plurality of radially inward protrusions are in alignment with an extension line of a corresponding one of said plurality of radial protrusions.

3. The device for detecting seismic motion according to claim 1, wherein:
each of said plurality of radially inward protrusions have a triangular cross-section, with an apex facing a vertical axis of said inner casing.

4. The device for detecting seismic motion according to claim 1, wherein:
said plurality of radially inward protrusions is six.

5. The device for detecting seismic motion according to claim 1, wherein:
each of said plurality of radially inward protrusions are at intervals and degrees of protrusion such that said seismic detection ball is separated from contacting said casing perimeter wall between adjacent ones of said plurality of radially inward protrusions by a spaced apart amount.

6. The device for detecting seismic motion according to claim 5, wherein:
said spaced apart amount is from about 0.1 mm to about 0.15 mm.

7. A device for detecting seismic motion, comprising:
an inner casing;
a seismic detection ball rotatably movable within said inner casing;
switch means for opening and closing an electric circuit in response to rotation of said seismic detection ball;
means for suspending said inner casing, including means for damping swaying of said inner casing;
said means for suspending including means for automatic centering;
said inner casing including first and second layers;
said first layer including an inside case;
said second layer being an outside case;
said outside case being made of metal; and
said inside case being made of a moldable, non-metallic material.

8. The device for detecting seismic motion according to claim 7, wherein:
said moldable, non-metallic material is a synthetic resin.

9. The device for detecting seismic motion according to claim 7, wherein:
a bottom wall of said outside case is thicker than a peripheral wall of said outside case.

10. A device for detecting seismic motion, comprising:
an inner casing;
a seismic detection ball rotatably movable within said inner casing;
switch means for opening and closing an electric circuit in response to radial displacement of said seismic detection ball;
said inner casing having a receptacle plate on a downward facing inside upper surface thereof;
a plurality of receptacle protrusions on said receptacle plate projecting into said inner casing;
said receptacle protrusions being generally radially disposed, whereby said seismic detection ball is constrained from moving in a circular motion around said surface;
means for suspending said inner casing, including means for damping swaying of said inner casing; and
said means for suspending including means for automatic centering.

11. The device for detecting seismic motion according to claim 10, wherein:
a bottom wall of said inner casing is thicker that a peripheral wall of said inner casing.

12. A device for detecting seismic motion, comprising:
an inner casing;
a seismic detection ball rotatably movable within said inner casing;
switch means for opening and closing an electric circuit in response to radial displacement of said seismic detection ball;
said switch means including an upper electrode and a lower electrode;
said upper electrode including a plurality of contacts and a plurality of stabilizing pieces; and
said seismic detection ball being made of a non-magnetic material.

13. The device for detecting seismic motion according to claim 12, wherein:
said non-magnetic material is at least one of stainless steel, copper pyrite, an alloy of lead and zinc, and a ceramic.

14. A device for detecting seismic motion, comprising:
an inner casing;
a seismic detection ball rotatably movable within said inner casing;
switch means for opening and closing an electric circuit in response to radial displacement of said seismic detection ball;

a plurality of radial protrusions in an inner surface of a bottom wall of said inner casing arranged in an upward and outward slope and radiating from a central area of said bottom wall; and a plurality of radially inward protrusions parallel with one another on an inner peripheral wall of said inner casing;

said radially inward protrusions constraining said seismic detection ball from a circular rotation motion along said inner peripheral wall when said seismic detection ball is lifted up from said bottom wall;

means for suspending said inner casing including means for damping swaying of said inner casing;

said means for suspending including means for automatic centering;

said inner casing including first and second layers;

said first layer including an inside case;

said second layer being an outside case;

said outside case being made of metal; and said inside case being made of a moldable, non-metallic material.

15. The device for detecting seismic motion according to claim 14, wherein:

said seismic detection ball is made of a non-magnetic material.

16. The device for detecting seismic motion according to claim 15, wherein:

said non-magnetic material is at least one of stainless steel, copper pyrite, an alloy of lead and zinc, and a ceramic.

* * * * *